(12) United States Patent
Durvasula et al.

(10) Patent No.: US 11,748,163 B2
(45) Date of Patent: *Sep. 5, 2023

(54) CONTROL TOKEN AND HIERARCHICAL DYNAMIC CONTROL

(71) Applicant: ServiceNow, Inc., Santa Clara, CA (US)

(72) Inventors: Sreenivas Durvasula, Hyderabad (IN); Prabodh Saha, Hyderabad (IN); Amitav Mohanty, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 17/175,030

(22) Filed: Feb. 12, 2021

(65) Prior Publication Data

US 2021/0165693 A1      Jun. 3, 2021

Related U.S. Application Data

(63) Continuation of application No. 16/217,917, filed on Dec. 12, 2018, now Pat. No. 10,929,186.

(51) Int. Cl.
*G06F 9/46*      (2006.01)
*G06F 9/50*      (2006.01)

(52) U.S. Cl.
CPC ................... *G06F 9/5027* (2013.01)

(58) Field of Classification Search
CPC .................................................. G06F 9/5027
USPC ....................................................... 718/104
See application file for complete search history.

(56) References Cited

U.S. PATENT DOCUMENTS

| | | | | |
|---|---|---|---|---|
| 6,321,229 B1* | 11/2001 | Goldman | ............ | G06F 16/9027 |
| 6,678,887 B1* | 1/2004 | Hallman | ................... | G06F 8/70 |
| | | | | 717/176 |
| 6,799,189 B2* | 9/2004 | Huxoll | ................ | G06F 12/0866 |
| 6,816,898 B1* | 11/2004 | Scarpelli | ................. | H04L 41/50 |
| | | | | 709/224 |
| 6,895,586 B1* | 5/2005 | Brasher | ............... | H04L 61/4553 |
| | | | | 709/201 |
| 7,020,706 B2* | 3/2006 | Cates | ...................... | G06F 8/656 |
| | | | | 709/240 |
| 7,027,411 B1* | 4/2006 | Pulsipher | ................ | H04L 41/12 |
| | | | | 370/254 |
| 7,350,209 B2* | 3/2008 | Shum | ...................... | H04L 41/22 |
| | | | | 715/965 |
| 7,392,300 B2* | 6/2008 | Anantharangachar | ...................... | |
| | | | | H04L 41/22 |
| | | | | 370/254 |
| 7,526,494 B2* | 4/2009 | Rom | ...................... | G06Q 30/00 |
| 7,617,073 B2* | 11/2009 | Trinon | .................. | G06F 11/324 |
| | | | | 702/186 |

(Continued)

*Primary Examiner* — Mehran Kamran
(74) *Attorney, Agent, or Firm* — FLETCHER YODER PC

(57) ABSTRACT

The present approach relates to systems and methods for facilitating an interrupt or change in automated tasks in progress, and using a control token (e.g., flag) to modify the progress of the automated task. In contrast to current automated tasks that may not be modified once the request for the automated task has been sent, the presently disclosed techniques allow for controlling and/or changing an automated task by using the control token and an associated status in conjunction with logical checkpoints defined for a thread at which the thread can be paused and the status changed.

20 Claims, 8 Drawing Sheets

(56) References Cited

U.S. PATENT DOCUMENTS

| | | | |
|---|---|---|---|
| 7,685,167 B2 * | 3/2010 | Mueller | G06Q 10/06 707/999.2 |
| 7,716,353 B2 * | 5/2010 | Golovinsky | G06F 16/958 709/229 |
| 7,769,718 B2 * | 8/2010 | Murley | G06F 16/2308 707/649 |
| 7,890,802 B2 * | 2/2011 | Gerber | G06Q 10/06 717/124 |
| 7,925,981 B2 * | 4/2011 | Pourheidari | H04L 67/10 715/744 |
| 7,933,927 B2 * | 4/2011 | Dee | G06F 16/2246 707/999.102 |
| 7,945,860 B2 * | 5/2011 | Vambenepe | G06Q 30/06 715/744 |
| 8,082,222 B2 * | 12/2011 | Rangarajan | G06F 16/256 707/609 |
| 8,151,261 B2 * | 4/2012 | Sirota | G06F 8/658 717/176 |
| 8,209,701 B1 * | 6/2012 | Roytman | G06F 9/5027 718/106 |
| 8,346,752 B2 * | 1/2013 | Sirota | G06F 8/60 719/329 |
| 8,380,645 B2 * | 2/2013 | Kowalski | G06F 16/90332 706/12 |
| 8,402,127 B2 * | 3/2013 | Solin | G06F 9/5072 709/227 |
| 8,612,408 B2 * | 12/2013 | Trinon | G06F 16/23 707/705 |
| 8,646,093 B2 * | 2/2014 | Myers | G06F 21/105 713/157 |
| 8,683,032 B2 * | 3/2014 | Spinelli | H04L 41/14 709/224 |
| 8,745,040 B2 * | 6/2014 | Kowalski | G06Q 10/00 707/769 |
| 8,812,539 B2 * | 8/2014 | Milousheff | G06F 16/2365 707/769 |
| 8,818,994 B2 * | 8/2014 | Kowalski | G06Q 10/00 707/769 |
| 8,832,652 B2 * | 9/2014 | Mueller | G06F 9/44536 717/121 |
| 8,907,988 B2 * | 12/2014 | Poston | G06T 11/206 345/660 |
| 9,015,188 B2 * | 4/2015 | Behne | G06F 16/2365 713/1 |
| 9,037,536 B2 * | 5/2015 | Vos | G06F 16/2453 707/674 |
| 9,043,801 B2 * | 5/2015 | Kupferschmidt | G06F 9/5027 718/105 |
| 9,065,783 B2 * | 6/2015 | Ding | H04L 43/0882 |
| 9,098,322 B2 * | 8/2015 | Apte | G06F 9/45533 |
| 9,122,552 B2 * | 9/2015 | Whitney | H04L 67/10 |
| 9,137,115 B2 * | 9/2015 | Mayfield | G06Q 10/06 |
| 9,261,372 B2 * | 2/2016 | Cline | G06F 16/245 |
| 9,317,327 B2 * | 4/2016 | Apte | G06F 9/50 |
| 9,323,801 B2 * | 4/2016 | Morozov | G06F 16/2462 |
| 9,363,252 B2 | 6/2016 | Mueller et al. | |
| 9,534,903 B2 | 1/2017 | Cline et al. | |
| 9,535,737 B2 * | 1/2017 | Joy | H04L 41/0803 |
| 9,557,969 B2 * | 1/2017 | Sharma | G06F 8/35 |
| 9,613,070 B2 * | 4/2017 | Kumar | G06F 16/00 |
| 9,631,934 B2 | 4/2017 | Cline et al. | |
| 9,659,051 B2 * | 5/2017 | Hutchins | G06F 16/211 |
| 9,766,935 B2 * | 9/2017 | Kelkar | G06F 9/5011 |
| 9,785,427 B2 * | 10/2017 | Hu | G06F 8/61 |
| 9,792,387 B2 * | 10/2017 | George | G06F 3/04842 |
| 9,805,322 B2 * | 10/2017 | Kelkar | G06F 8/71 |
| 9,852,165 B2 * | 12/2017 | Morozov | G06F 16/951 |
| 9,967,162 B2 | 5/2018 | Spinelli et al. | |
| 10,002,203 B2 | 6/2018 | George et al. | |
| 10,042,628 B2 * | 8/2018 | OlmstedThompson | H04L 41/0886 |
| 2004/0143833 A1 * | 7/2004 | Heyrman | G06F 9/5044 718/100 |
| 2008/0250405 A1 * | 10/2008 | Farhangi | G06F 8/61 717/177 |
| 2010/0186020 A1 * | 7/2010 | Maddhirala | G06F 9/5072 718/105 |
| 2011/0078687 A1 * | 3/2011 | Somogyi | G06F 9/526 718/101 |
| 2011/0246998 A1 * | 10/2011 | Vaidya | G06F 9/4881 718/103 |
| 2012/0110150 A1 * | 5/2012 | Kosuru | H04L 41/0863 709/221 |
| 2015/0309874 A1 * | 10/2015 | Liang | G06F 11/1076 714/766 |
| 2015/0309881 A1 * | 10/2015 | Holmes | G06F 11/1456 707/649 |
| 2017/0053120 A1 * | 2/2017 | Kamble | H04L 63/145 |
| 2017/0097831 A1 * | 4/2017 | Gopshtein | G06F 8/38 |
| 2017/0115978 A1 * | 4/2017 | Modi | G06F 8/65 |
| 2017/0315831 A1 * | 11/2017 | Shi | G06F 9/44 |
| 2017/0337154 A1 * | 11/2017 | Barber | G06F 9/5016 |
| 2018/0060061 A1 | 3/2018 | Savagaonkar et al. | |
| 2018/0129374 A1 * | 5/2018 | Kim | G06F 16/254 |
| 2018/0239604 A1 * | 8/2018 | Cain, III | G06F 9/3851 |
| 2019/0163562 A1 * | 5/2019 | Dubeyko | G06F 11/0757 |
| 2020/0044963 A1 * | 2/2020 | Kwok | H04L 45/125 |
| 2020/0110676 A1 * | 4/2020 | Volos | G06F 11/203 |
| 2021/0165693 A1 * | 6/2021 | Durvasula | G06F 9/485 |

* cited by examiner

CONTROL TOKEN AND HIERARCHICAL DYNAMIC CONTROL

CROSS-REFERENCE TO RELATED APPLICATIONS

This application is a continuation of U.S. application Ser. No. 16/217,917, entitled "CONTROL TOKEN AND HIERARCHICAL DYNAMIC CONTROL," filed on Dec. 12, 2018, and will issue as U.S. Pat. No. 10,929,186 on Feb. 23, 2021, which is herein incorporated by reference in its entirety for all purposes.

BACKGROUND

The present disclosure relates generally to interrupting or changing an automated task in progress using a control token.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Information Technology (IT) networks may include a number of computing resources (e.g. computing devices, switches, etc.) and software resources (e.g. database applications) that may be used to maintain a cloud-computing network infrastructure. Maintaining a network may utilize the resources for client or administrative based automated tasks, such as applying updates, performing database maintenance, and so forth.

Each automated task may be executed by processing a thread of code or instructions. However, once a request to execute the automated task has been sent, the execution may not be interrupted, such that the automated task may not be instructed to pause or cancel. Thus, any unexpected delay or issues in completing the automated task may unnecessarily delay other automated tasks in queue for a particular resource. Moreover, administrators may need to update or modify an automated task that is executing or access resources unavailable while the task is executing. In view of the inflexible operations of an automated task in progress, determining an interrupt or modifying mechanism for the automated task in order to implement a change may be difficult to implement in practice.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present approach relates to systems and methods for facilitating an interrupt or change in a cloud-computing environment in which automated tasks are in progress. In certain implementations, a control token (e.g., a flag) is used to modify the progress of the automated task.

The systems and methods disclosed herein allow for interrupting progress of an automated task based on a control token sent to a thread of code or instructions for executing the automated task. The control token may be a flag sent to the thread or set on the thread and identified at a logical checkpoint in the thread. The control token may indicate a change or update needing to be applied to the automated task, such that the change may be instructions to interrupt the progress of the automated task. Moreover, a status may be associated with the control token to indicate a type of change that may be implemented on the automated task, such as a status of pause, cancel, or resume.

In some implementations, instructions to pause, cancel, or resume the automated task may refer to an associated application or task tag rather than individual threads for each automated task, thereby controlling multiple automated tasks simultaneously. In this manner, the system may efficiently manage automated tasks after they have been initialized without unnecessarily locking resources when the automated tasks requests may no longer be applicable.

Refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
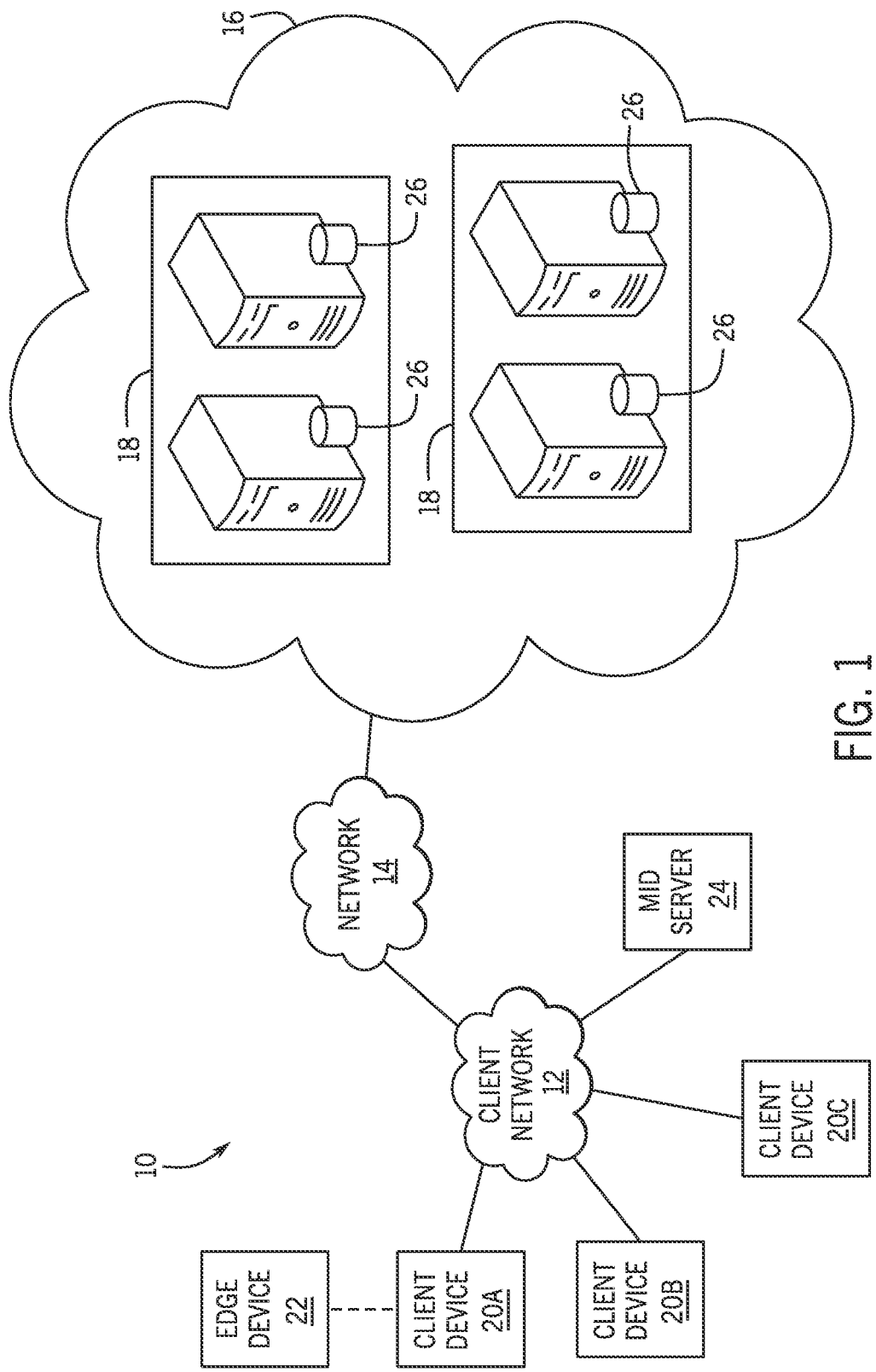
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "control token" refers to an instructional event flag that indicates a status change for an ongoing automated task. Based on the flag status, an automated task may update, modify, or continue its operation of processing a thread of code to execute the automated task.

Furthermore, as used herein, the term "resource" refers to a device or processor-executable code used to maintain the cloud-computing network, such as hardware resources (e.g. computing devices, switches, web servers, etc.) and software resources (e.g. database applications, etc.). As used herein, the term "lock" or "locking" refers to reserving or limiting access to or operation of a resource in a computing environment, such as a multi-instance or multi-tenant cloud-based platform.

As discussed herein, an administrative or client automated task may be implemented to perform one or more operations in a computer, network, or cloud environment. Once the automated task is initialized, such as by a request to execute an automated task, the automated task typically cannot be interrupted. By way of example, an administrator may determine that an automated task in progress is incompatible for processing on the particular resource and that a different version of the automated task should be executed instead. Since the automated task has already been initialized, the administrator must wait for the automated task to complete or fail to complete due to incompatibility errors, prior to sending instructions for executing the modified or correct task. In this example, the incompatible automated task may take hours or days to execute, and thus, the resources used to implement the incompatible automated task may be locked for an unnecessary duration to allow the automated task to complete.

Accordingly, it is now appreciated that there is a need to manage (e.g., cancel) an automated task in progress so as to reduce or eliminate time a resource is locked during which the automated task may no longer need to be executed. However, determining an interrupt or modifying mechanism for an automated task in progress in order to implement a change may be difficult to implement in practice.

With the preceding in mind, the following figures relate to various types of generalized system architectures or configurations that may be employed to provide services to an organization in a cloud-computing framework and on which the present approaches may be employed. Correspondingly, these system and platform examples may also relate to systems and platforms on which interrupting an automated task operation using a control token as discussed herein may be implemented or otherwise utilized. Turning now to FIG. 1, a schematic diagram of an embodiment of a cloud computing system 10, where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices 20 are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server 26 instances handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server 26 instances causing outages for all customers allocated to the particular server instance. In such circumstances, client instances may be moved to another data center 18, and thus, may require resource locking to perform the instance move. Accordingly, the automated task of moving the instance may not be interrupted and the locked resource may not be used by a different automated task until the instance has completed the move to another datacenter 18.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2. As discussed herein, as part of maintaining or implementing a computer environment, such as those described above, various automatic tasks or automated tasks, such as cloning or moving a customer or server instance that impact one or more resources may be routinely implemented. Once the implementation has been initialized, the automated task may be interrupted in order to modify the automated task progress in accordance with a control token status, as will be discussed in detail in FIGS. 5-10.

Figure 2:
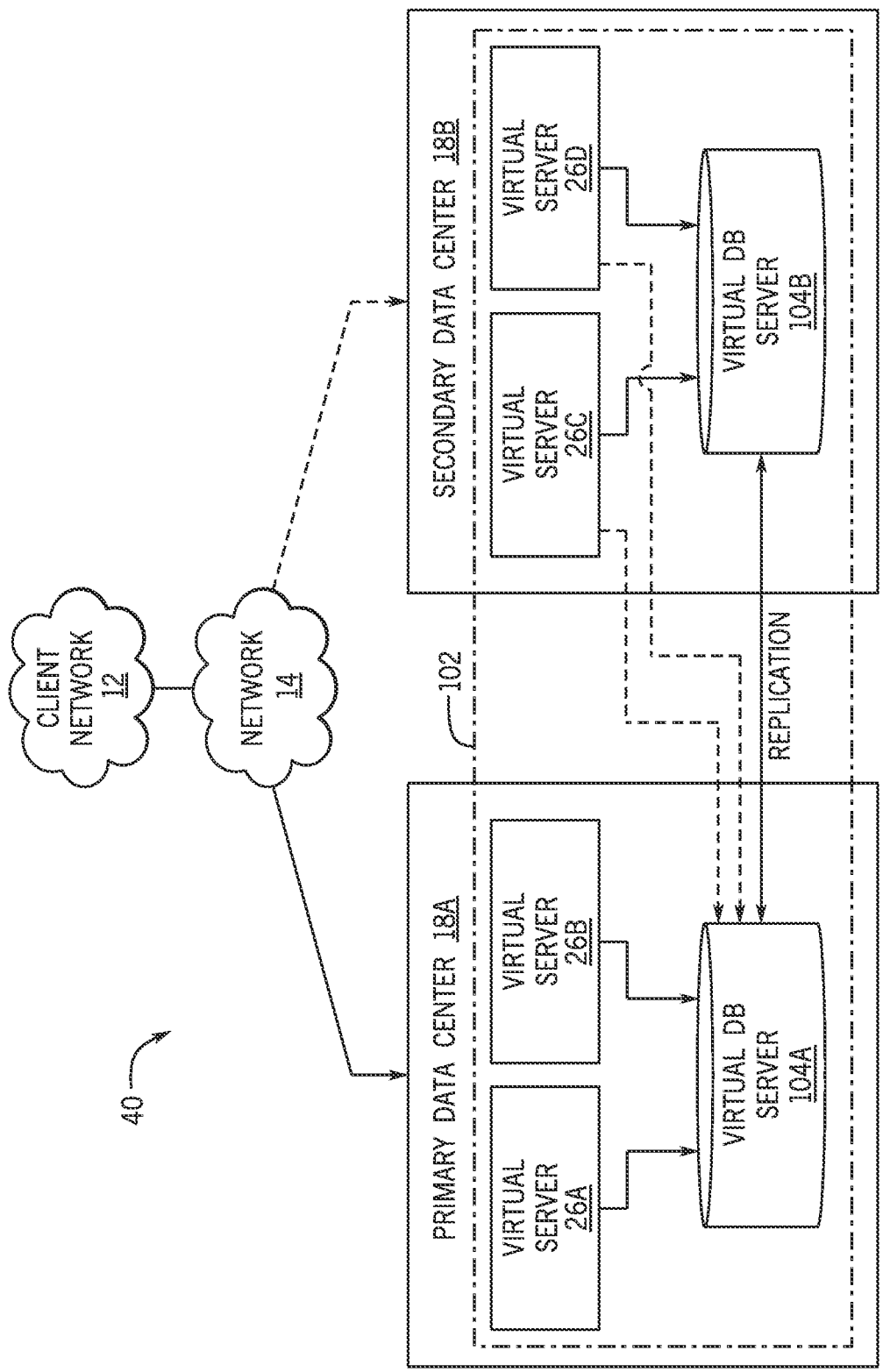
FIG. 2 is a schematic diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 40 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
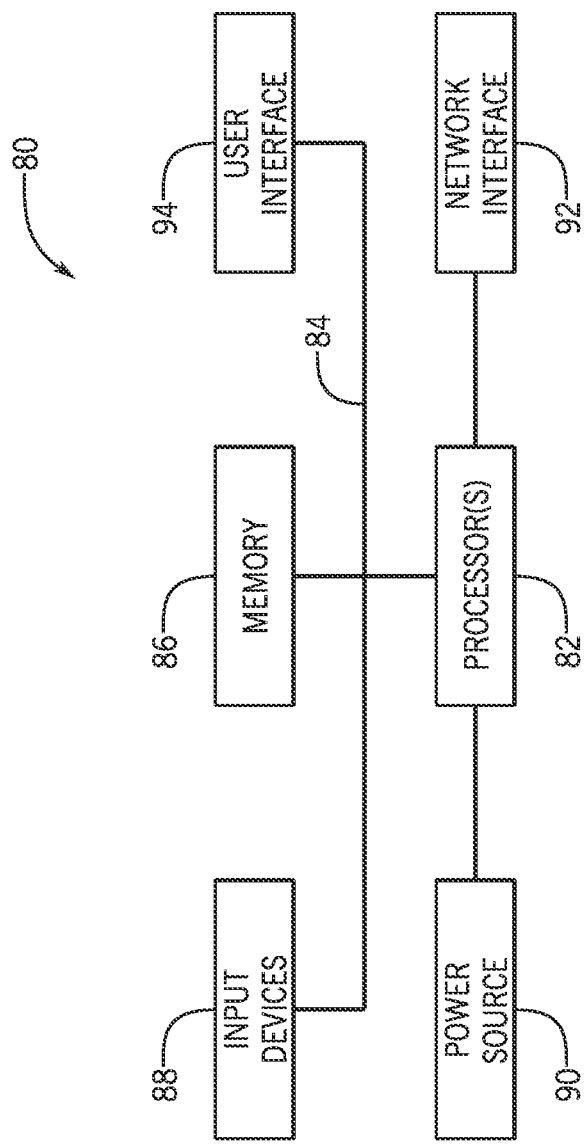
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 include suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processors 82. For example, the input devices 88 may include a mouse, touchpad, touchscreen, keyboard and the like. The power source 90 can be any suitable source for power of the various components of the computing system 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figures 4, 5:
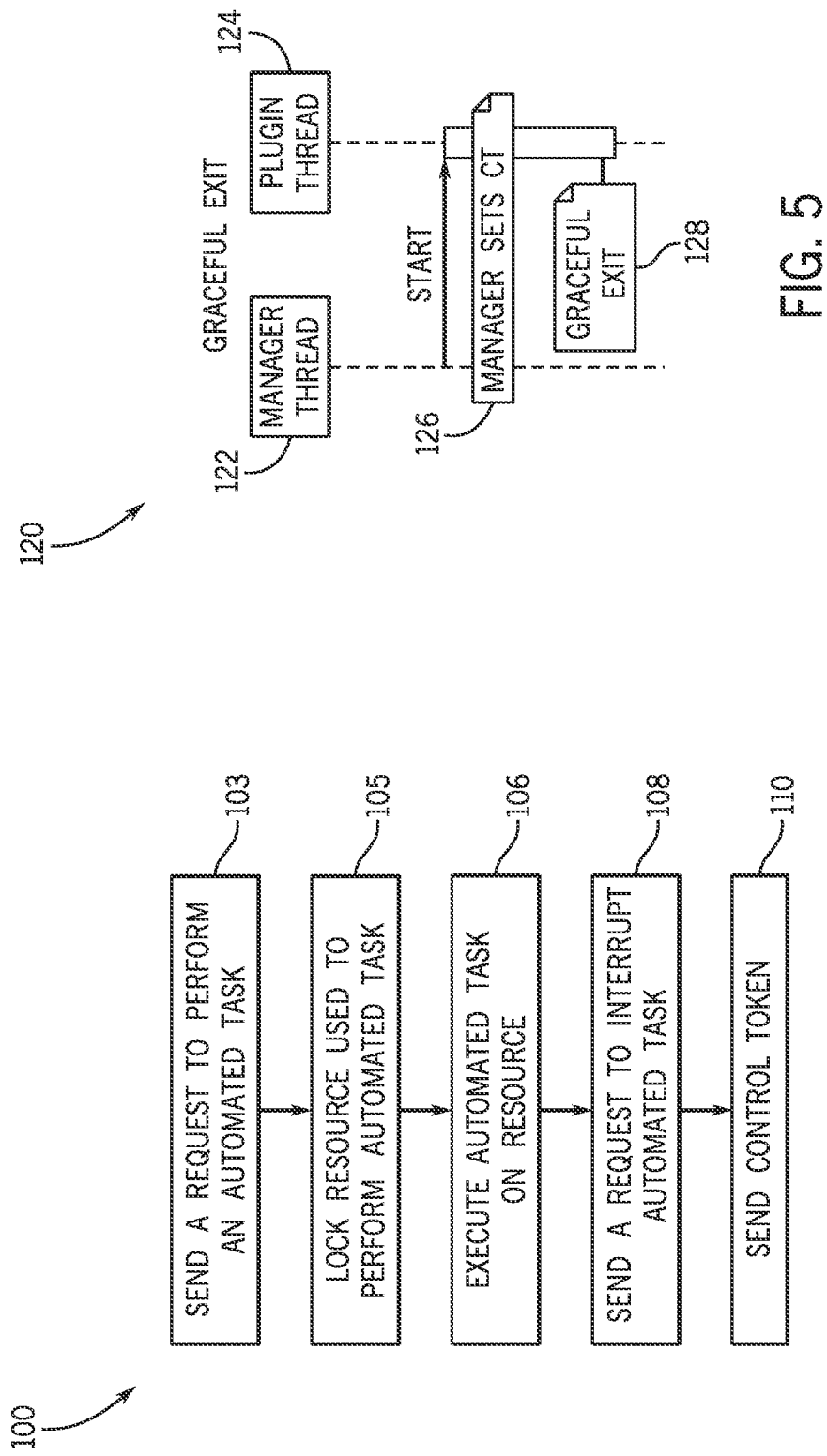
FIG. 4 is a process flow diagram of interrupting an automated task in progress, in accordance with aspects of the present disclosure.
FIG. 5 is a flow diagram illustrating an automated task gracefully exiting, in accordance with aspects of the present disclosure.

With the preceding in mind, FIG. 4 is a process flow diagram 100 depicting use of a control token that may be used to interrupt the progress of an automated task and subsequently allow the automated task to exit in a graceful manner, in accordance with aspects of the present disclosure. The steps illustrated in the process 100 may be performed by a cloud computing system 10 operated by service or administrative agents, for example, for the purpose of interrupting the processes running on resources impacted by one or more automated tasks performed on a computing platform. Furthermore, the steps illustrated in the process 100 are meant to facilitate discussion and are not intended to limit the scope of this disclosure, since additional steps may be performed, certain steps may be omitted, and the illustrated steps may be performed in an alternative order or in parallel where appropriate.

In the depicted example, a request to execute an automated task or sequence of tasks that will impact a resource (e.g., a hardware resource, database, application, and so forth) present in a networked environment, such as a cloud computing system 10, may be sent (block 103) in response to a client or administrative agent initiated request. The request for an automated task may be initialized to resolve a service issue or problem, to apply an upgrade or update, moving or cloning data or instances, or to otherwise improve or support operation of a client instance, and thus, may be used to maintain the network 14 and/or client network 12. In one implementation, the resources associated with the automated tasks may be locked (block 105), as appropriate, to perform the automated task. As will be discussed in detail in FIG. 5, in some circumstances, one or more automated tasks that are in progress may no longer need to be executed based on changes in the computing system 10 and/or may be inapplicable to the circumstances (e.g., based on an out-of-date executable, based on incorrect parameters or configurations, etc.) and thus, the one or more automated tasks may need to be canceled using techniques utilizing a control token as described herein.

Once the automated task type has been determined and the particular resource has been locked if needed, the automated task may be executed (block 106) on the resource. Often, after a request has been received to perform the automated task and/or the automated task has been initialized, it may be determined, either automatically or in view of a user input, that the automated task is no longer appropriate and should be either modified or canceled. By way of example, such determinations may be made when the request for the particular automated task is determined to be an incompatible or older version of the automated task, the automated task is no longer in compliance with network protocols, the automated is failing to properly execute, another automated task scheduled for the resource takes priority, etc.

It may also be determined that the automated task is not properly executing, such as completing the task with errors. To enable executing a different automated task and/or another automated tasks in queue for the particular resource, a request may be sent (block 108) to interrupt the automated task that is in progress but not properly executing. In accordance with the present approach, to facilitate with the interruption, a control token may be sent (block 110), such as by one or more devices on the cloud computing system 10, to an agent or virtual machine executing routines for the automated task, as will be discussed in detail in FIGS. 5-9.

With the preceding in mind, FIG. 5 is a block diagram 120 illustrating use of a control token scheme to gracefully exit an automated task in progress. As used herein, an automated task is associated with a thread of code or instructions for the automated task type that may be executed by an agent or may be a routine executing in a virtual or non-virtual environment. In this implementation, a manager thread 122 may be code to initialize an automated task on a particular resource by controlling a worker thread or plugin thread 124 to process code associated with the automated task. Thus, the plugin thread may be the thread of code associated with the automated task itself.

By way of example, a remote request to perform an automated task may be sent from a central control center device or application of the cloud computing system 10 to a particular data center 18 with the particular resource impacted by the automated task that may locally implement the request by processing a manager thread 122 for the automated task. The remote request may be sent to the data center 18 based on the automated task type and the resources needed to perform the automated task. The automated task request may be processed locally by the manager thread 122, which may control the processing of a plugin thread 124 for the particular automated task to execute on one or more of the resources, such as virtual or physical servers in the data center 18.

As depicted, the manager thread 122 may send instructions to the plugin thread 124 to start executing the automated task on a particular resource based on the received requests for automated task type. Additionally or alternatively, the manager thread 122 may also be used to manage a resource lock schedule by initializing a multitude of plugin threads 124 for automated tasks in accordance with automated tasks scheduled for execution. After the automated task begins executing, the manager thread 122 may set 126 a control token for the plugin thread based on new instructions, such as may be received from one or more devices of the cloud computing system 10. The control token may set a flag for the code processing the automated task in progress to indicate that there has been a change to the previously requested automated task.

In this implementation, the control token may be associated with a "cancel" or "exit" flag, such as to cancel the execution in progress and gracefully exit 128 the task. A graceful exit may refer to additional steps to process in order to end the task, such as closing referenced applications and/or files used to execute the automated task. The additional steps ensure that the exiting instructions leave the application and/or files in a recoverable or original format, such as at a designated checkpoint at which the task can be stopped cleanly. Thus, the control token and associated status, may be used to interrupt the progress of an automated task, as opposed to allowing an unwanted or erroneous task to run to completion.

Figure 6:
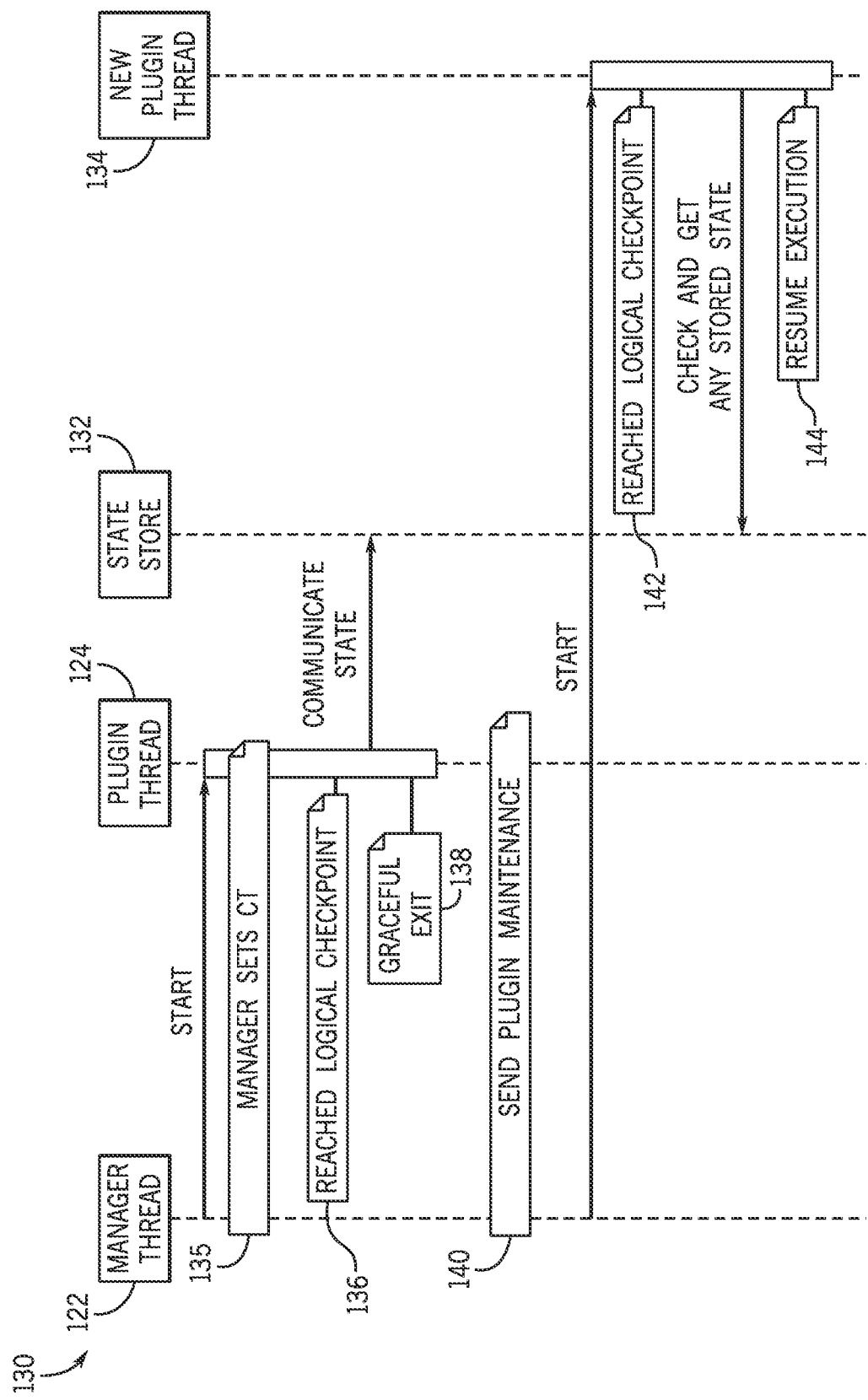
FIG. 6 is a flow diagram illustrating an automated task processing a control token, in accordance with aspects of the present disclosure.

To illustrate the interruption of an automated task based on the status of a control token, FIG. 6 depicts a flow diagram 130 of a plugin thread 124 processing a control token and its status to modify an automated task in progress. As shown the manager thread 122 may send instructions to the plugin thread 124 to start executing the automated task on a particular resource based on the received requests for automated task type. Based on a request sent to modify the automated task in progress, the manager thread 122 may set (block 135) a control token. The control token may be a flag to instruct a "pause," "cancel," or "resume" status.

The plugin thread 124 used to execute the automated task may include logical checkpoints within its code. A logical checkpoint may be a periodic logic point in the thread of code to check the state of the automated task in progress. The plugin thread 124 may communicate the present state of the automated task to a state store 132. The state store 132 may be used to further communicate the current state or status of the automated task being executed, such as to a control center of the implemented on a device of the cloud computing system 10. For example, the state of the automated task may include failures/errors or successful executions. Thus, the state (e.g., failures or errors in processing the automated task) communicated may be compared and processed to generate or send a control token in response to the state. Moreover, if a control token has been received prior to a plugin thread 124 logical checkpoint, then the plugin thread 124 may communicate the new state of the automated task based on the control token status. In this implementation, the plugin thread 124 for an automated task in progress may reach (block 136) a logical checkpoint and the state stored indicates that a control token with a status "cancel" has been received. Thus, the automated task state stored and communicated may include a state of "canceled." After the control token has been processed, the plugin thread 124 may gracefully exit (block 138) execution of the automated task using the techniques described in FIG. 6.

After the plugin thread 124 has exited the code for processing the automated task, the manager thread 122 may send (block 140) a plugin maintenance to the plugin thread 124. The plugin maintenance may indicate that the plugin thread 124 is undergoing a change, such as instructions to process a new thread of code. In this manner, the plugin maintenance may be used to continue locking the resource until additional instructions or threads are received from the manager thread 122.

The manager thread 122 may determine that a new plugin thread 134 may be used to process a new automated task. The new plugin thread 134 may be initialized or started in response to a remote request received from a device of the cloud computing system 10. For example, an administrator or administrative routine may determine that the automated task in progress is incompatible for processing on the particular resource and that a different version of the automated task should be executed instead. Thus, a new plugin thread 134 for the automated task may be executed. Once the new plugin thread 134 begins executing the automated task, the thread may reach (block 142) a logical checkpoint. As previously discussed, the present state of the automated task may be checked and retrieved from the state store 132, which may further communicate the state to the manager thread 122. In this implementation, the state indicates a successful execution thus far and that a control token to implement a change has not been received. Accordingly, the new plugin thread 134 may resume (block 144) execution of the automated task. In some circumstances, automated tasks may be dependent on each another, such that a change to one automated task may require a corresponding change to another automated task. By way of example, an automated task may include updating an instance in a primary data center while another automated task may include cloning or moving the instance to a backup data center. Thus, the cloning of the instance in the backup data center may be dependent on the instance being updated in the primary data center.

Figure 7:
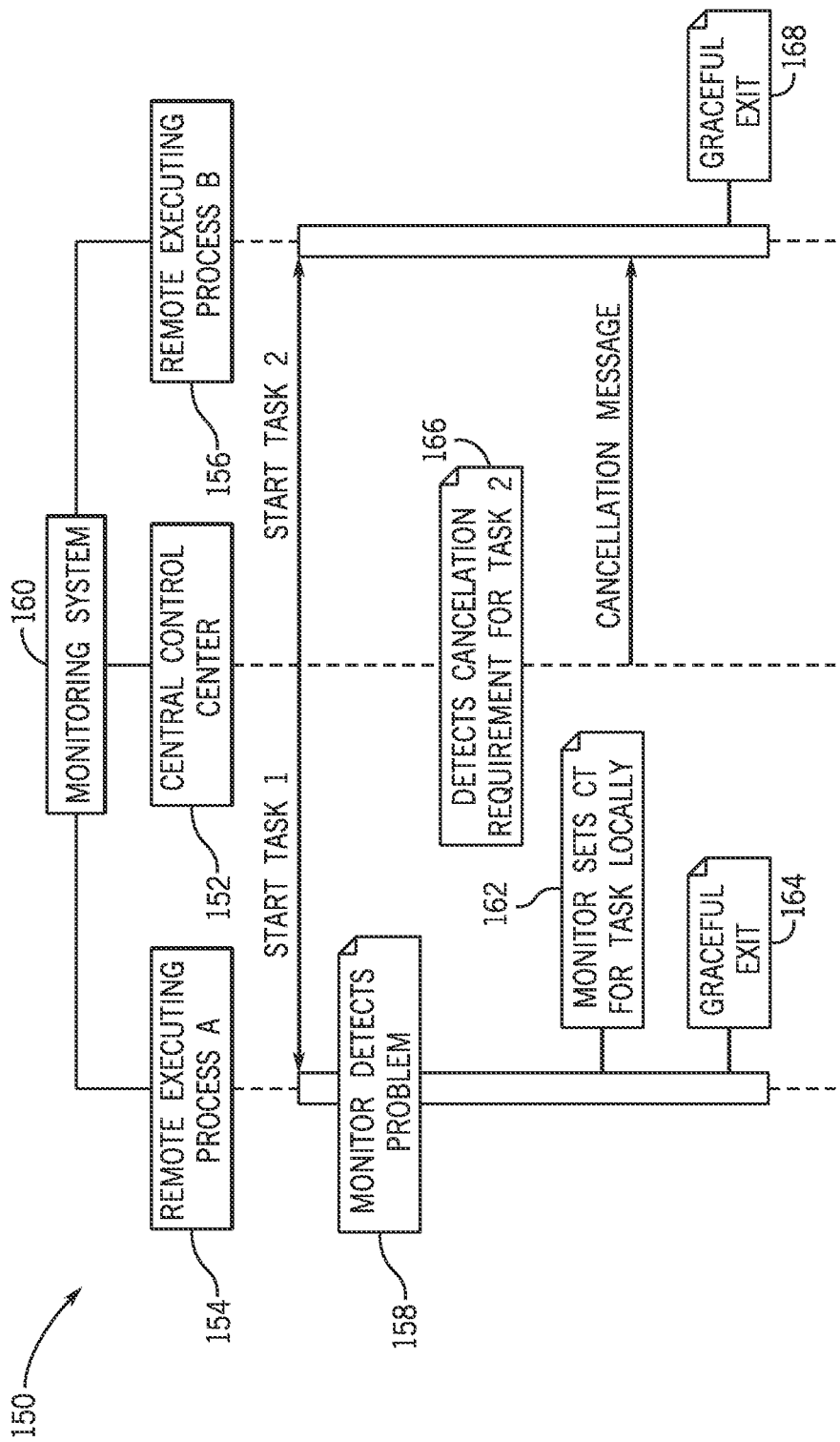
FIG. 7 is a flow diagram illustrating dependent automated tasks utilizing a control token to gracefully exit both tasks, in accordance with aspects of the present disclosure.

With this in mind, FIG. 7 is a flow diagram 150 depicting a change to a remote executing process, such as a process for an automated task that causes a dependent remote executing process to be correspondingly modified. As shown, a device of the cloud computing system 10 may send remote requests for a remote executing process A 154 and a remote executing process B 156 to execute automated tasks on one or more resources. Both the remote executing processes A 154 and B 154 may be threads executing separate but related automated tasks in the same or different data centers 18. After the remote executing process A 154 begins executing a first automated task, a monitoring system 160 implemented on a device of the cloud computing system 10 may detect (block 158) a problem. The problem may include any unexpected behavior or error while executing the thread. The monitoring system may be automated or incorporate user review and feedback and may determine and send real time system conditions and/or changes and automated task notifications, such as failures or errors in occurring in an automated task executing. Additionally, the monitoring system 160 may be a secondary checking system that not only monitors alerts and/or notifications received by the remote executing processes A and B 154, 156 related to automated task, but may also control the remote executing processes A and B 154, 156, such as by sending notifications to change a dependent executing thread or routine. Additionally or alternatively, and as shown in the depicted embodiment, the monitoring system 160 may be communicatively coupled to a central control center 152 implemented on a device or application of the cloud computing system 10 to communicate its determinations, which may further control remote executing processes A, B 154, 156. The monitoring system 160 may further be communicatively coupled to data centers 18 to locally implement any changes (e.g., manager thread 122 plugin sets control tokens) based on monitored events and/or requests received. Although the monitoring system 160 and the central control center 152 are depicted as separate systems to simplify explanation, they may be integrated in practice, such that the central control center 152 includes the monitoring system 160.

Based on the error detected, the monitoring system 160 may locally set (block 162) a control token with a predetermined status for the associated error. In this implementation, the error may be such that the remote executing process A 154 may be canceled. Thus, the monitoring system may set the control with a "cancel" status, causing the remote executing process A 154 to gracefully exit (block 164).

Upon setting the control token, the central control center 152, which is communicatively coupled to the monitoring system 160, may detect (block 166) a cancellation requirement for any dependent or associated tasks related to remote executing process A 154, such as the remote executing process B 156. Accordingly, the central control center 152 may send a cancellation message to the remote executing process B 156, which may cause the remote executing process B 156 to also gracefully exit (block 168). In this manner, monitoring a single executing automated task and setting a control token may be used to modify other dependent automated tasks, thereby efficiently controlling a multitude of related automated tasks.

Figure 8:
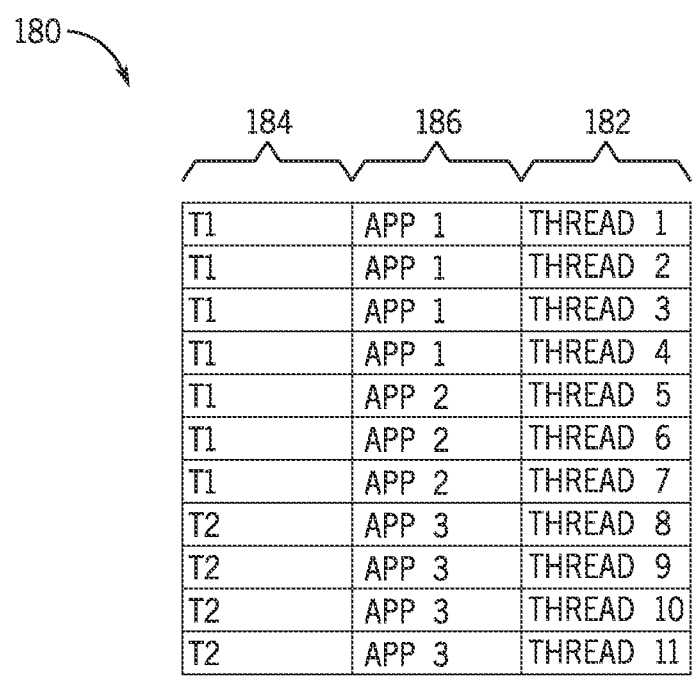
FIG. 8 is a flow diagram illustrating automated tasks tags, in accordance with aspects of the present disclosure.

Multiple processing threads executing automated tasks may be simultaneously controlled by tagging the threads with a commonality, such as a tag for a particular task or application category. The tag categories may include subcategories in a hierarchical structure. To illustrate, FIG. 8 depicts a block diagram 180 of multiple processing threads 182 tagged with a hierarchy of tags including a task tag 184 and an application tag 186, such that the application tag 186 is a subcategory of the task tag 186. Although shown are tags for applications, "App" or tasks, "T," which represents a particular embodiment, the tags may be implemented for any commonality between one or more threads. Furthermore, although the hierarchy of categories depicted includes two categories, the hierarchy may include an unlimited number (e.g., two, one hundred, thousands) of categories and subcategories.

As depicted, the processing threads 182 Thread1-4 may be tagged with "App1," Thread5-6 may be tagged with "App2," and Thread8-11 may be tagged with "App3" to indicate that threads 145 execute an automated task for the respective application (e.g., Application 1, 2, or 3). Similarly, processing threads 145 Thread1-7 may be tagged with "T1" and Thread8-11 may be tagged with "T2" to indicate that the processing threads 145 execute an automated task for the respective task (e.g., Task 1 or 2). In this manner, multiple threads may be efficiently controlled by processing instructions related to the category of a task or an application rather than individual threads. By way of example, referring back to FIG. 8, the monitoring system 160 or the central control center 152 of FIG. 8 may set a control token or send a cancellation message to cancel and exit all automated task threads for T1, such as a task of moving a client's instances, causing Thread1-7 to concurrently exit, thereby efficiently cancelling multiple automated tasks for the moving of the client's instances rather than sending individual cancellation messages for each automated task.

Figure 9:
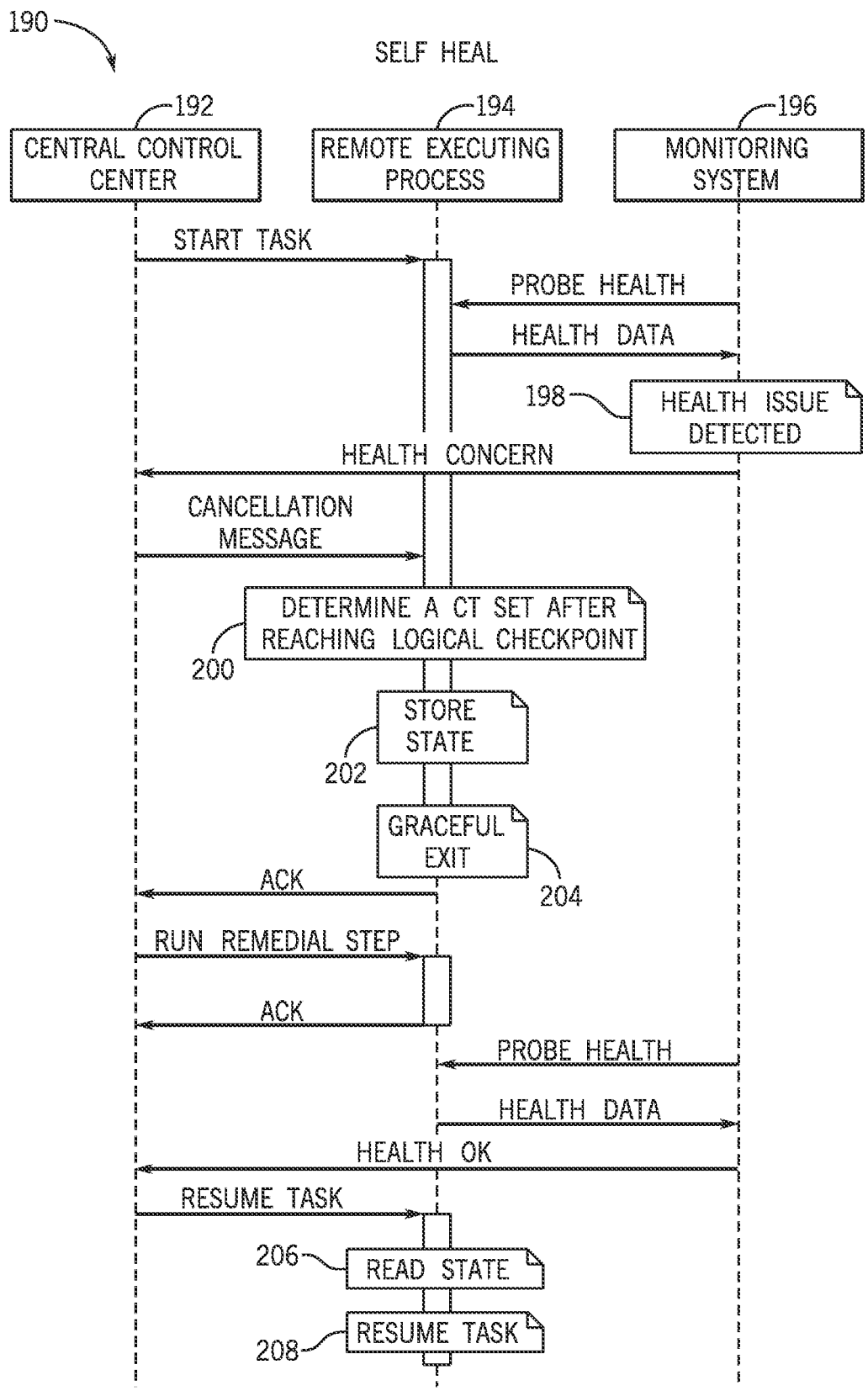
FIG. 9 is a flow diagram illustrating a self-healing system for monitoring and managing automated tasks by using control tokens, in accordance with aspects of the present disclosure.

The techniques described to interrupt or control an automated task in progress, such as by using control tokens in conjunction with logical checkpoints, may provide a mechanism to "self-heal," such that automated tasks that are not working as intended may be discovered and changes or modifications made to restore to a default or predetermined state without external intervention. To illustrate, FIG. 9 depicts a flow diagram 190 of a "self-healing" process using control tokens to restore a system executing automated tasks that may result in execution errors. Thus, the control tokens may optimize an automatic maintenance and repair architecture implemented on the cloud computing system 10 that executes responsive healing actions when errors are detected.

As shown, a central control center 192 may be used to control a remote executing process 194 executing an automated task, and the processing of the automated task may be monitored by a monitoring system 196. Although not explicitly shown in FIG. 9, the remote executing process 194 may include a manager thread and a plugin thread as described in FIG. 5, to execute the automated tasks and control token. Once the central control center 192 has instructed the remote executing process to 194 start executing a particular automated task using one or more resources, the monitoring system 196 may probe the execution of the automated task. For example, the monitoring system may monitor the multi-step processes of the automated task in progress by requesting execution data and the remote executing process 194 may communicate the data (e.g., successful execution, errors, etc.) periodically, such as at each step or at designated steps of the process.

If the monitoring system 196 detects (block 198) a health issue based on the data communicated, such as an unexpected response or error, the monitoring system 196 may communicate the health concern to the central control center 192. The health concern communicated may include the error data, such as the automated task step at which one or more errors are detected, type of errors, severity of errors, etc. In response to the data, the central control center 192 may take responsive remedial steps. The remedial response may be based on the specific error data received and/or predetermined threshold for the given errors. In some circumstances, such as a severe error, exiting the automated task may be the suitable response to prevent errors or delay of other automated tasks or processes. As depicted, the central control center 192 may send a cancelation message to the remote executing process 194, such as by sending a remote request to set a control token to exit the automated task. Although not explicitly shown, a manager thread may locally set control token status to "cancel" and cause a plugin thread executing the automated task to gracefully exit, as described in FIG. 5. Furthermore, and although not explicitly shown, dependent automated tasks may receive a corresponding cancelation message or control token, as described in FIG. 8.

After the remote request for a control token and associated status have been sent from the central control center 192 and received by the manager thread to set the control token locally on the remote executing process 194, the remote executing process may determine (block 200) the control token after a logical checkpoint has been reached, as previously described. More specifically, the remote executing process may include multiple threads within the same process. The manager thread may receive the signaling message or request from the central control center 192. The manager thread may then set the appropriate control token(s) for the one or more worker threads of the remote executing process 194 in the same process. The worker threads may honor the token after they have reached the logical checkpoint in their execution. In this example, the status associated with the control token set for error detected is a "cancel" status. The remote executing process 194 may store (block 202) the state of the automated task. The stored state may be communicated to the central control center 192 and/or monitoring system 196 to communicate that the remote executing process 194 is proceeding to exit. Next, the remote executing process 194 may gracefully exit (block 204) the automated task in progress using the techniques described above.

After the automated task has ended, the remote executing process 194 thread may communicate an acknowledgement (ACK) code to the central control center 192. The ACK code may be a control character transmitted by the receiver, and in this implementation it is the remote executing process 194, that indicates that the message received was without errors and has been accepted or implemented. Accordingly, the remote executing process 194 may send the ACK code to the central control center 192 when it has processed the received control token and gracefully exited its automated task.

The central control center 192 may run one or more remedial steps after it has received the ACK code from the remote executing process 194. The remedial steps may include, but are not limited to, sending a remote request for a new and/or different processing thread associated with the terminated automated task or a processing thread associated with a different remote automated task or process, which may receive messages on the central control center 192 on a different communication channel. The remote executing process 194 may send another ACK code to indicate acknowledgement and acceptance of the transmitted remedial steps. Since remedial steps were implemented on the remote executing process 194 thread, the monitoring system 196 may have been initialized to re-probe the remote executing process 194. In response to the probing, the remote executing process 194 thread may communicate its health or execution data, such as the remedial steps processed and their status. As shown, the monitoring system 196 may determine that remedial steps were successful or as expected, and communicate a "health OK" code to the central data center, indicating that overall status of the system is without error or within a predetermined error tolerance. Based on the healthy system status, the central control center 192 may send a resume task message to the remote executing process 194, such as to resume a new automated task thread that may be sent as remedial steps. Accordingly, the remote executing process 194 may read (block 206) the transmitted state message and resume (block 208) the automated task. To summarize, control tokens set for monitored automated tasks may create a self-healing process 190 for a cloud computing system 10 executing automated tasks if an unexpected error or failure occurs while executing the tasks.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A data center, comprising:
a computing device comprising one or more processors configured to execute instructions stored in memory of the computing device, wherein the instructions cause the one or more processors to:
process a request to perform an automated task in the data center, wherein the automated task impacts a subset of one or more resources utilized by the data center;
execute the automated task on the subset of the one or more resources by processing a thread of code, wherein the thread of code is tagged as being associated with an application, and wherein execution of the thread of code corresponds to execution of the application;
process an interrupt request to change in-progress processing of the automated task;
apply a control token to the thread, wherein the control token is associated with a status that changes the in-progress processing of the automated task; and
modify processing of the automated task based on the status of the control token, wherein modifying processing of the automated task causes a modification to the execution of the application.

2. The data center of claim 1, wherein the thread of code is tagged as being associated with the automated task.

3. The data center of claim 2, wherein the automated task is a subcategory of the application.

4. The data center of claim 1, wherein the instructions cause the one or more processors to concurrently modify a plurality of tagged threads executing the automated task, the application, or a combination thereof.

5. The data center of claim 1, wherein the status is set to pause or resume.

6. The data center of claim 1, wherein the data center receives the request to perform the automated task and the interrupt request to change the in-progress processing of the automated task from a remote control center, and wherein the data center locally sets a manager thread to execute the automated task, apply the control token to the thread, and modify processing of the automated task.

7. The data center of claim 1, wherein the instructions cause the one or more processors to exit the thread of code in a graceful manner to end the automated task in response to the status of the control token being set to cancel.

8. The data center of claim 7, wherein the graceful manner comprises processing additional steps to end the automated task, wherein the additional steps comprise code to stop the thread at a designated checkpoint and exit the thread leaving applications or files utilized in the automated task in a recoverable or original format.

9. The data center of claim 1, wherein modifying the automated task based on the status of the control token occurs at a logical checkpoint in the thread, wherein the logical checkpoint is a periodic logic point in the thread to check a state of the in-progress processing of the automated task.

10. The data center of claim 9, wherein the control token is a flag, and wherein the thread determines the flag at the logical checkpoint.

11. The data center of claim 9, wherein the thread communicates the state of the in-progress processing of the automated task at the logical checkpoint to a remote control center that controls a plurality of data centers, wherein the plurality of data centers comprises the data center.

12. The data center of claim 11, wherein the remote control center sends the interrupt request to the data center in response to receiving the state as indicating a failure.

13. The data center of claim 12, wherein the status of the control token is set to cancel for the interrupt request.

14. The data center of claim 1, wherein the instructions cause the one or more processors to modify a dependent thread associated with a dependent automated task that is dependent on the automated task based on the control token and the status.

15. The data center of claim 14, wherein a second data center of a plurality of data centers executes the dependent automated task on a second subset of one or more resources of the second data center.

16. A method for modifying an automated task in a computing system, the method comprising:

- processing a request to perform the automated task, wherein the automated task impacts a subset of one or more resources utilized by the computing system;
- executing the automated task on the subset of the one or more resources by processing a thread of code, wherein the thread of code is tagged as being associated with an application, and wherein execution of the thread of code corresponds to execution of the application;
- processing an interrupt request to change in-progress processing of the automated task;
- applying a control token to the thread, wherein the control token is associated with a status that changes the in-progress processing of the automated task; and
- modifying processing of the automated task based on the status of the control token, wherein modifying processing of the automated task causes a modification to the execution of the application.

17. The method of claim 16, comprising concurrently modifying a plurality of threads tagged with the application, the automated task, or a combination thereof, based at least in part on the modifying processing of the automated task.

18. A non-transitory machine-readable storage medium storing executable instructions that, when executed by a processor, cause operations to be performed comprising:

- processing a request to perform an automated task in a computing system, wherein the automated task impacts one or more resources utilized by the computing system;
- executing the automated task on the one or more resources by processing a thread of code, wherein the thread of code is tagged as being associated with an application, and wherein execution of the thread of code corresponds to execution of the application;
- processing an interrupt request to change in-progress processing of the automated task;
- applying a control token to the thread based on the interrupt request, wherein the control token is associated with a status that changes the in-progress processing of the automated task; and
- modifying processing of the automated task based on the status of the control token, wherein modifying processing of the automated task causes a modification to the execution of the application.

19. The non-transitory machine-readable storage medium of claim 18, wherein modifying processing of the automated task automatically modifies processing of a task that is related to the automated task.

20. The non-transitory machine-readable storage medium of claim 19, wherein the automated task comprises updating a client instance of a primary data center hosted by the computing system, and wherein the related task comprises cloning the client instance to a backup data center hosted by the computing system.

* * * * *